United States Patent
Scowen et al.

[11] 3,792,249
[45] Feb. 12, 1974

[54] SIGNAL LAMP AND LENS

[75] Inventors: Kenneth J. Scowen, Springfield, N.J.; Elliott Goldbaum, Brooklyn, N.Y.

[73] Assignee: Signal-Stat Corporation, Brooklyn, N.Y.

[22] Filed: Dec. 27, 1972

[21] Appl. No.: 318,953

[52] U.S. Cl............ 240/106.1, 240/7.1 R, 340/94
[51] Int. Cl............................................. F21q 1/00
[58] Field of Search .... 240/8.1, 8.2, 8.22, 8.3, 41.3, 240/41.35 A, 41.2, 46.33, 106 R, 106.1, 7.1 R; 340/84, 93, 94, 95

[56] References Cited
UNITED STATES PATENTS

| | | | |
|---|---|---|---|
| 3,192,376 | 6/1965 | Najimian, Jr. | 240/106 R X |
| 3,345,506 | 10/1967 | Hautzenroeder | 240/8.3 X |
| 1,702,429 | 2/1929 | Donley | 240/8.3 X |
| 1,559,930 | 11/1925 | Bean | 240/41.35 A |
| 2,380,691 | 7/1945 | Gross | 240/8.3 X |

*Primary Examiner*—Joseph F. Peters, Jr.
*Attorney, Agent, or Firm*—Blum, Moscovitz, Friedman & Kaplan

[57] ABSTRACT

A signal lamp for providing a plurality of signals, constructed with more than one independently illuminated compartment, having a single lens covering the compartments, wherein light from one signal compartment is prevented from being transmitted within the lens material and falsely illuminating the portion of the lens covering a second compartment. By means of an optical light trap located in the lens at the intersection of the lamp compartments, the piping of light through the lens is prevented. The invention is also concerned with the lens construction.

10 Claims, 3 Drawing Figures

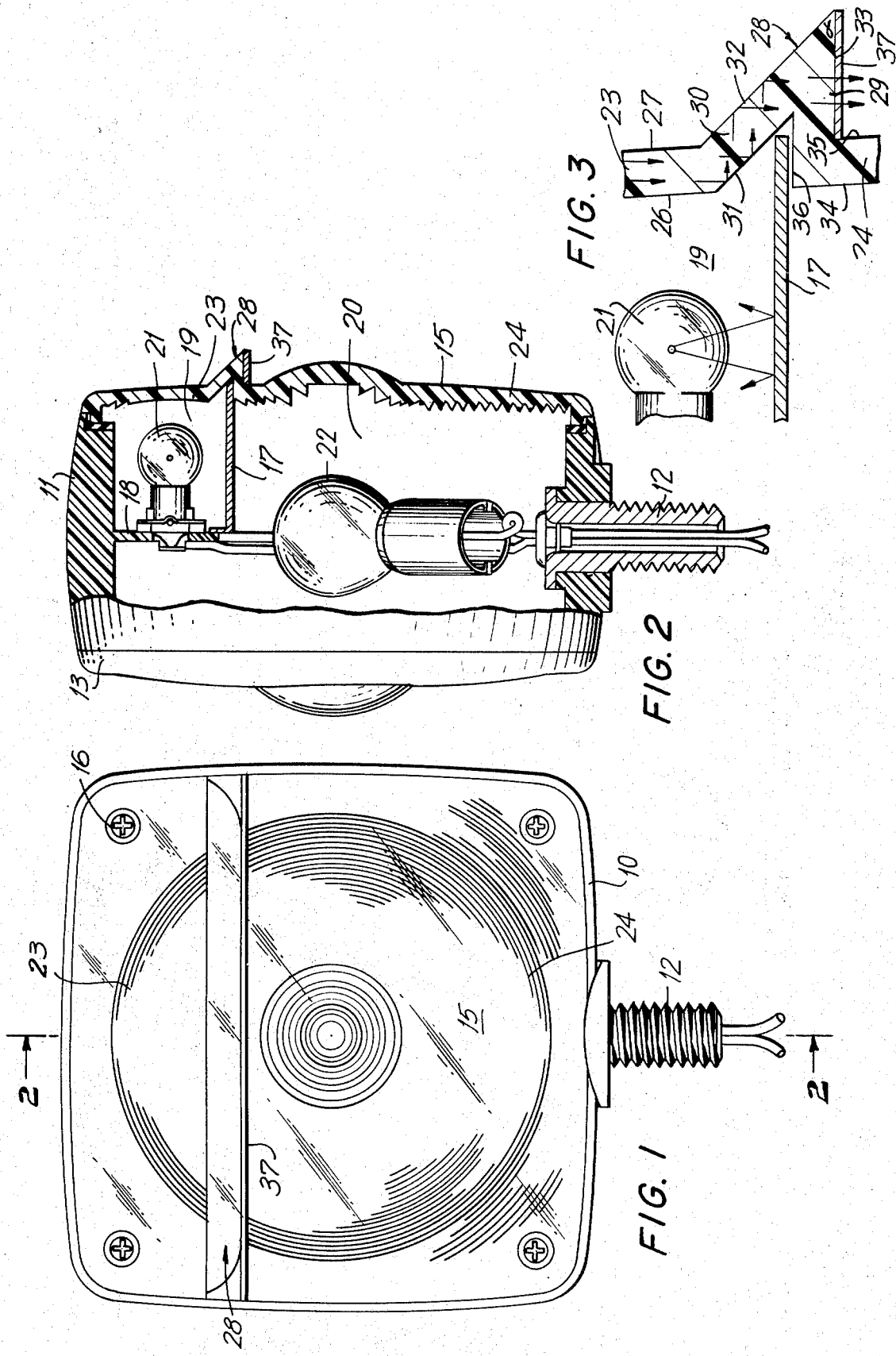

3,792,249

SIGNAL LAMP AND LENS

BACKGROUND OF THE INVENTION

This invention relates generally to a signal lamp capable of providing at least two separately illuminated signals. It is well known in the art to accomplish this result by providing independently illuminated compartments within the lamp and cover the compartments with a unitary lens. However, false illumination of the lens area covering a compartment not illuminated by light trapped within the lens has posed numerable problems. It is toward elimination of this problem that this invention is directed.

SUMMARY OF THE INVENTION

Generally speaking, in accordance with the invention, a signal lamp having independently illuminated compartments is provided with a unitary lens to cover the compartments. The lens is provided with an optical light trap at the intersection of the compartments to prevent light that has entered the lens at the illuminated compartment and has become trapped therein from being piped within and by the lens into the other areas of the lens and falsely illuminating these areas.

Accordingly, it is an object of this invention to provide an improved lamp and lens therefor which will prevent light from being piped from an illuminated portion of a lens to a nonilluminated portion thereof.

Other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a front view of a signal lamp constructed in accordance with a preferred embodiment of the instant invention;

FIG. 2 is a partial sectional view taken along line 2—2 of FIG. 1; and

FIG. 3 is a view of a portion of FIG. 2 at an enlarged scale.

DESCRIPTION OF THE PREFERRED EMBODIMENT

The lamp shown in the drawings consists generally of a housing 11 being open at opposite ends with a mounting stud 12 attached to the housing for securely mounting the lamp on a motor vehicle or other structure. A lens 13 is secured to one of the open ends of the housing by fasteners not shown. A lens 15 is similarly secured to the other open end by fasteners 16. An opaque plate 17 is mounted within the housing to vertical wall 18. Plate 17 and wall 18 cooperate to divide the internal area of the housing into two compartments, a first compartment 19 and a second compartment 20. Each of the compartments is independently illuminated. The first compartment is illuminated by light source 21, and the second compartment is illuminated by light source 22.

With reference to FIG. 2, lens 15 has an upper lens area 23 covering the first illuminated compartment 19 and a lower lens area 24 covering the second illuminated compartment 20. Lens 15 is provided with an optical light trap at the junction of compartments 19 and 20.

As best seen in FIG. 3, the optical light trap is formed as a lateral projection 28 comprising a lower portion 29 which is perpendicular to and extends beyond the external face of areas 23 and 24 in the direction of light transmission and an inclined portion 30.

Light from source 21 will enter the upper area 23 through internal surface 26. The light will continue through the lens material until it strikes external surface 27. When a ray of light passes from one medium into another which is less refracting, as in this case from the lens material into air, there exists a least angle of incidence at which total reflection takes place. Said angle is defined as the critical angle. The light striking external surface 27 at an angle less than the critical angle will break from the material into the air. However, the light striking this surface at an angle which is greater than the critical angle will reflect from the surface back into the lens material. This trapped light will conduct itself within the lens material and strike surface 31 of inclined portion 30. The light striking this surface at an angle less than the critical angle will break into compartment 19. The light striking this surface at an angle greater than the critical angle will be relfected back. This reflected light will then strike external surface 32 and be either passed into the air or reflected toward external surface 33. Since angle $\alpha$ formed by the intersection of external surface 32 and external surface 33 is less than 90°, the light reflected back from surface 32 will strike surface 33 at an angle less than the critical angle and pass from the lens. Thus no light will conduct itself into the lower lens area 24.

Plate 17 may extend into the transverse projection beyond the internal surface 34 and the external surface 35 of lower lens area 24 to prevent light from light source 21 or the light that breaks from surface 31 into compartment 19 from reentering the lens through surface 36. An alternative preventive means would be to terminate plate 17 at surface 34 and coat surface 36 with an opaque material.

External surface 33 may be coated with an opaque material 37 to prevent the trapped light from breaking into the air adjacent to external surface 35, reflecting from external surface 35, and creating the impression that the lower lens area 24 is illuminated.

While a preferred embodiment of the invention has been shown and described herein, it will be understood that the principles of the invention allow for other lamp constructions. For example, the lamp could be open on one side only and carry a lens 15 on the open side cooperating with two compartments within the lamp. The lamp could be open on two sides as shown in the drawing but carry two lenses 15 cooperating with two, three or four compartments within the lamp.

It will thus be seen that the objects set forth above and those made apparent from the preceding description are efficiently attained, and since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A unitary lens for a lamp having at least two independently illuminated portions, said lens having at least two areas and being provided with light trap means at the junction of said areas for preventing light which is transmitted through one of said areas from being transmitted through the lens material into the other of said areas.

2. A lens as claimed in claim 1, wherein said light trap means comprises a projection formed as a part of said lens which projects in the direction of light transmission beyond the surface of said areas.

3. A lens as claimed in claim 2, wherein said projection includes a lateral projection which joins the surface of said other area in a generally perpendicular relationship.

4. A lens as claimed in claim 3, wherein said lateral projection is coated with an opaque material.

5. A lamp comprising a housing having open opposite ends, plate means within said housing separating said housing into at least first and second illuminated portions, a first lens secured to the housing over one of said open ends, and a second lens secured to the housing over the other said open end, at least one of said lenses having two areas and being provided with light trap means at the junction of said areas for preventing light which is transmitted through one of said areas from being transmitted through the lens material into the other of said areas.

6. A lamp as claimed in claim 5, wherein said light trap means comprises a projection formed as a part of said lens which projects in the direction of light transmission beyond the surface of said areas.

7. A lamp as claimed in claim 6, wherein said plate means extends into said light trap means beyond both the inner and outer surfaces of the other of said areas.

8. A lamp as claimed in claim 6, wherein said projection includes a lateral projection which joins the surface of said other area in a generally perpendicular relationship.

9. A lamp as claimed in claim 8, wherein said lateral projection is coated with an opaque material.

10. A lamp comprising a housing having at least one open end, a plate within said housing separating said housing into first and second illuminated portions, and a lens secured to said housing over said open end, said lens having two areas and being provided with light trap means at the junction of said areas for preventing light which is transmitted through one of said areas from being transmitted through the lens material into the other of said areas.

* * * * *